(12) United States Patent
Hassani et al.

(10) Patent No.: US 10,593,335 B2
(45) Date of Patent: Mar. 17, 2020

(54) DYNAMIC ACOUSTIC MODEL FOR VEHICLE

(71) Applicant: Ford Global Technologies, LLC, Dearborn, MI (US)

(72) Inventors: Ali Hassani, Ann Arbor, MI (US); Gary Steven Strumolo, Canton, MI (US); Pramita Mitra, West Bloomfield, MI (US); David Melcher, Ypsilanti, MI (US); Mark A. Cuddihy, New Boston, MI (US); Craig John Simonds, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 15/747,276

(22) PCT Filed: Aug. 24, 2015

(86) PCT No.: PCT/US2015/046473
§ 371 (c)(1),
(2) Date: Jan. 24, 2018

(87) PCT Pub. No.: WO2017/034536
PCT Pub. Date: Mar. 2, 2017

(65) Prior Publication Data
US 2018/0286413 A1    Oct. 4, 2018

(51) Int. Cl.
*G10L 15/26* (2006.01)
*G10L 17/02* (2013.01)
*G10L 17/04* (2013.01)
*G10L 15/07* (2013.01)
*G10L 17/22* (2013.01)
*G10L 15/22* (2006.01)
(Continued)

(52) U.S. Cl.
CPC .............. *G10L 17/22* (2013.01); *G10L 15/22* (2013.01); *G10L 17/005* (2013.01); *G10L 15/07* (2013.01); *G10L 15/187* (2013.01); *G10L 2015/025* (2013.01); *G10L 2015/227* (2013.01)

(58) Field of Classification Search
CPC ................................. G06F 17/20; G10L 17/14
See application file for complete search history.

(56) References Cited

U.S. PATENT DOCUMENTS 9,037,125 B1    5/2015  Kadous
2011/0224979 A1  9/2011  Raux
(Continued)

OTHER PUBLICATIONS

International Preliminary Report on Patentability for PCT/US2015/046473 dated Mar. 8, 2018 (6 pages).
(Continued)

*Primary Examiner* — Shreyans A Patel
(74) *Attorney, Agent, or Firm* — Brandon Hicks; Bejin Bieneman PLC

(57) ABSTRACT

A vehicle voice processor includes a processing device and a data storage medium. The processing device is programmed to receive identification information from a wearable device, identify a speaker from the identification information, identify a dialect associated with the speaker from the identification information, select a predetermined acoustic model, and adjust the predetermined acoustic model based at least in part on the dialect identified.

16 Claims, 3 Drawing Sheets

(51) Int. Cl.
  *G10L 17/00*  (2013.01)
  *G10L 15/187*  (2013.01)
  *G10L 15/02*  (2006.01)

(56) References Cited

U.S. PATENT DOCUMENTS

| | | |
|---|---|---|
| 2012/0253811 A1 | 10/2012 | Breslin et al. |
| 2013/0080173 A1 | 3/2013 | Talwar et al. |
| 2014/0136187 A1* | 5/2014 | Wolverton ............... G10L 15/22 704/9 |
| 2014/0278395 A1 | 9/2014 | Zurek et al. |
| 2014/0379346 A1 | 12/2014 | Aleksic et al. |
| 2015/0112684 A1* | 4/2015 | Scheffer ................. G10L 17/14 704/257 |

OTHER PUBLICATIONS

International Search Report and Written Opinion dated Nov. 30, 2015 re PCT/US2015/046473.

* cited by examiner

DYNAMIC ACOUSTIC MODEL FOR VEHICLE

CROSS-REFERENCE TO RELATED APPLICATION

This application claims priority to PCT/US2015/046473 titled "Dynamic Acoustic Model for Vehicle" filed on 24 Aug. 2015, the contents of which are hereby incorporated by reference in its entirety.

BACKGROUND

Vehicles with voice recognition allow an occupant to control certain vehicle functions using voice commands. Voice commands allow the occupant to control the infotainment system, the entertainment system, the climate control system, etc., by speaking certain commands understandable to the vehicle. The vehicle will process and carry out the voice commands by outputting various control signals in accordance with the voice commands received.

DETAILED DESCRIPTION

Figure 1:
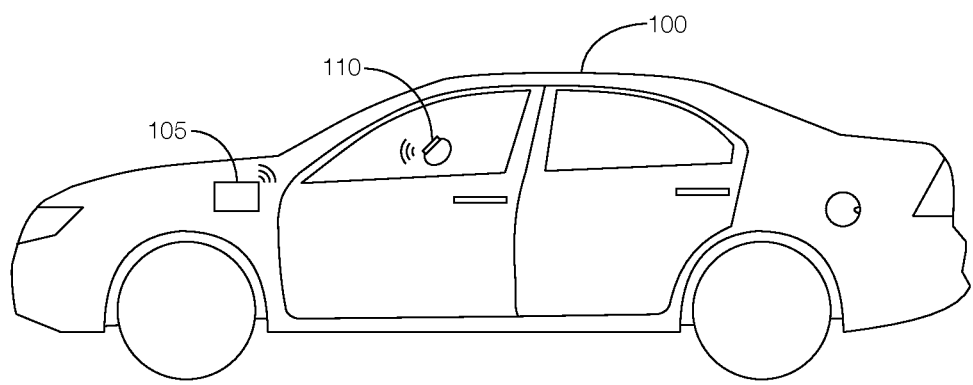
FIG. 1 illustrates an example vehicle having a voice processing system in communication with a wearable device.

Improving how occupants interact with vehicles via speech would enhance the in-vehicle experience. A natural speech model, which allows occupants to feel as though they are communicating with their vehicle rather than simply giving it a command, is one way to improve occupant-vehicle interaction. Before natural speech models can become ubiquitous in vehicles, the vehicle must be able to recognize speech more consistently and more accurately.

One way to increase the consistency and accuracy of vehicle voice recognition systems includes modifying the way the voice recognition system processes speech. Traditional acoustic models are static and trained under a variety of conditions that would be considered typical for the automatic speech recognition (ASR) use cases. That is, traditional acoustic models are trained according to a generic person's expected speech patterns. It would be cost prohibitive, if not impossible, to include an acoustic model for every possible dialect and accent. Moreover, background noise makes it difficult for traditional acoustic models to accurately process speech.

Wearable devices may allow the vehicle to better identify and understand a particular occupant's speech patterns. An example vehicle voice processor, that can customize an acoustic model for a particular person based on data from that person's wearable device, includes a processing device and a data storage medium. The processing device is programmed to receive identification information from the wearable device, identify a speaker from the identification information, identify a dialect associated with the speaker from the identification information, select a predetermined acoustic model, and adjust the predetermined acoustic model based at least in part on the dialect identified.

Accordingly, the voice processor can dynamically reweight the acoustic model as a function of identification information by the wearable device. Since traditional acoustic models are built as a linear combination of feature vectors derived from training sets under a variety of appropriate combinations, and since many static models do a poor job of handling accented speech, the voice processor can calibrate the acoustic model to the particular speaker identified by the wearable device. Calibrating the acoustic model can include, e.g., selecting and weighting applicable feature vectors.

Thus voice processor can leverage data collected by the wearable device. The data can include basic classification information, such as race, ethnicity, primary language, etc., volunteered by the user when setting up the wearable device. Alternatively or in addition, the data can include classifications performed by machine learning algorithms to specifically identify how the user's phoneme distributions are biased. With this information, the voice processor can reweight the acoustic model to the optimal linear combination of feature vectors for the speaker, greatly improving speech recognition. Additionally, voice recognition (identification of the speaker by voice) could be used with adaptive learning paradigms built into, e.g., the infotainment system to further enhance recognition, as the infotainment system can build a profile that continually augments the feature vector weights.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the host vehicle 100 includes a voice processing system 105 in communication with a wearable device 110. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode.

The wearable device 110 may include any number of circuits or components that permit the wearable device 110 to wirelessly communicate with the voice processing system 105. The wearable device 110 may be configured to communicate using any number of wireless communication technologies such as, e.g., Bluetooth®, Bluetooth Low Energy®, Wi-Fi, Wi-Fi Direct, etc. The wearable device 110 may be programmed to pair with the voice processing system 105, which may permit the wearable device 110 and the voice processing system 105 to exchange data. For instance, the wearable device 110 may be programmed to transmit identification information, associated with the person wearing the wearable device 110, to the voice processing system 105. The identification information may include, e.g., an identity of the speaker. The identity of the speaker may be based on, e.g., information provided by the speaker when the wearable device 110 is set up. Setting up the wearable device 110 may include generating a profile and associating the profile to the wearable device 110. The identification may include, e.g., a unique identifier associated with the speaker, and the unique identifier may be transmitted to the host vehicle 100 along with the identification information.

The identification information may further include dialect information. For instance, the wearable device 110 may engage in an ongoing "training" function where the wearable device 110 continuously attempts to understand the user's speech by, e.g., matching spoken phonemes to expected phonemes. The differences between the spoken phonemes and the expected phonemes may be characterized as the speaker's dialect. The dialect information, therefore, may identify the speaker's dialect or another representation of the spoken phonemes relative to the expected phonemes.

The voice processing system 105 may be programmed to pair with, and receive identification information from, the wearable device 110. The voice processing system 105 may process the identification information to identify the speaker. With the speaker identified, the voice processing system 105 may select an acoustic model. The acoustic model, which may be referred to as a "predetermined acoustic model," may be a standard model incorporated into the voice processing system 105.

The voice processing system 105 may further identify a dialect of the speaker. The dialect may be determined from the identity of the speaker or other information about the speaker, including the dialect information transmitted from the wearable device 110. For instance, dialects may be associated with different geographic regions, which could include a present geographic region of the speaker or a previous geographic region of the speaker (the geographic region where the speaker grew up or spent the most time). By way of example, one dialect may be selected for a speaker who spent the majority of his life near Boston and a different dialect may be selected for a speaker who spent the majority of his life in the southern United States. Instead of or in addition to geography, the voice processing system 105 may determine the speaker's dialect based on the "training" performed by the wearable device 110.

The voice processing system 105 may adjust the predetermined acoustic model, to create a calibrated acoustic model, based on the dialect identified. Adjusting the predetermined acoustic model may include, e.g., selecting a voice feature among multiple voice features. Each voice feature may be associated with a particular phoneme. Adjusting the predetermined acoustic model may further include adjusting a weight applied to the selected voice feature. The weight applied may indicate how much influence a particular phoneme should receive in interpreting the speaker's speech. Thus, increasing the weight may make the feature more influential while decreasing the weight may make the feature less influential.

The voice processing system 105 may receive an acoustic signal (i.e., speech uttered by the person wearing the wearable device 110) and apply the calibrated acoustic model to the acoustic signal. The voice processing system 105 may process the acoustic signal according to the calibrated acoustic model and generate appropriate commands, consistent with the voice commands represented by the acoustic signal, to one or more vehicle subsystems 115 (see FIG. 2).

Figure 2:
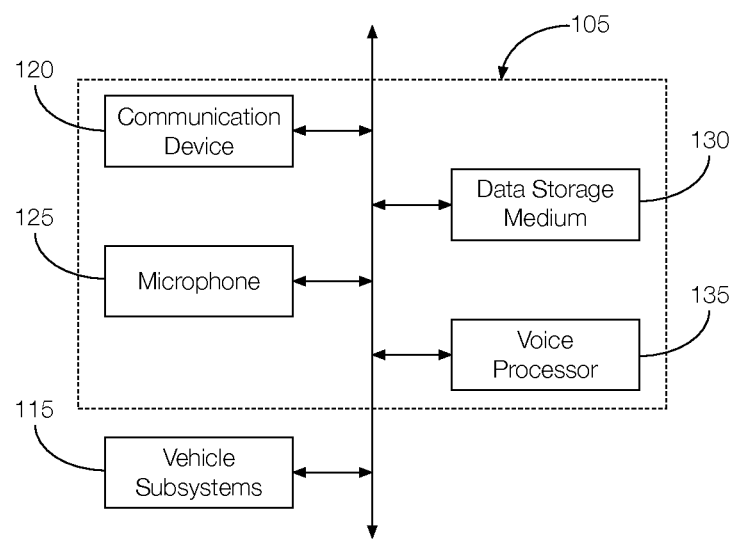
FIG. 2 is a block diagram showing example components of the voice processing system.

FIG. 2 is a block diagram showing example components of the voice processing system 105. As shown, the voice processing system 105 includes a communication device 120, a microphone 125, a data storage medium 130, and a voice processor 135.

The communication device 120 may include any number of circuits or components that facilitate communication between the wearable device 110 and the voice processor 135. The communication device 120 may be programmed to communicate with the wearable device 110 via any number of wireless communication technologies such as, e.g., Bluetooth®, Bluetooth Low Energy®, Wi-Fi, Wi-Fi Direct, etc. The communication device 120 may be programmed to pair with the wearable device 110 and wirelessly receive identification information, including dialect information, from the wearable device 110. The communication device 120 may be programmed to transmit the identification information to, e.g., the voice processor 135.

The microphone 125 may include any number of circuits or components that can receive an acoustic signal, such as speech, and convert the acoustic signal into an electrical signal, which may be referred to as an "analog acoustic signal." For instance, the microphone 125 may include a transducer that generates the analog acoustic signal in accordance with the speech. The microphone 125 may be located in, e.g., the passenger compartment of the host vehicle 100. In some possible implementations, the microphone 125 may be configured or programmed to output the analog acoustic signal to, e.g., a signal converter so that the analog acoustic signal may be converted to a digital acoustic signal.

The data storage medium 130 may include any number of circuits or components that can store electronic data. In one possible approach, the data storage medium 130 may include computer-executable instructions. The data storage medium 130 may also or alternatively store acoustic models. The acoustic models may include, e.g., any number of predetermined acoustic models, which as discussed above may be standard models incorporated into the voice processing system 105. Further, the data storage medium 130 may be programmed or configured to store one or more calibrated acoustic models.

The voice processor 135 may include any number of circuits or components configured or programmed to process speech. In one possible approach, the voice processor 135 may be programmed to receive the identification information from the communication device 120 and identify a speaker (i.e., the person wearing the wearable device 110) from the identification information. The voice processor 135 may be further configured to identify a dialect associated with the speaker. The dialect may be determined from the identification information, which as discussed above may include dialect information. The voice processor 135 may be programmed to select one of the predetermined acoustic models stored in the data storage medium 130. The selection of the predetermined acoustic model may be based on, e.g., the identification information. Further, the voice processor 135 may be programmed to adjust the selected predetermined acoustic model based on, e.g., the dialect information either received from the wearable device 110 or inferred from the identification information (e.g., inferred form a geographic region associated with the person wearing the wearable device 110). As discussed above, the adjusted predetermined acoustic model may be referred to as a calibrated acoustic model, and the voice processor 135 may be programmed to store the calibrated acoustic model in the data storage medium 130. With the calibrated acoustic model generated, the voice processor 135 may receive analog or digital acoustic signals in real time and apply the calibrated acoustic model to any received acoustic signals to better understand the utterances of the person speaking. If the speech includes voice commands, the voice processor 135 may generate and output command signals to one or more vehicle subsystems 115 that carry out the voice command.

Figure 3:
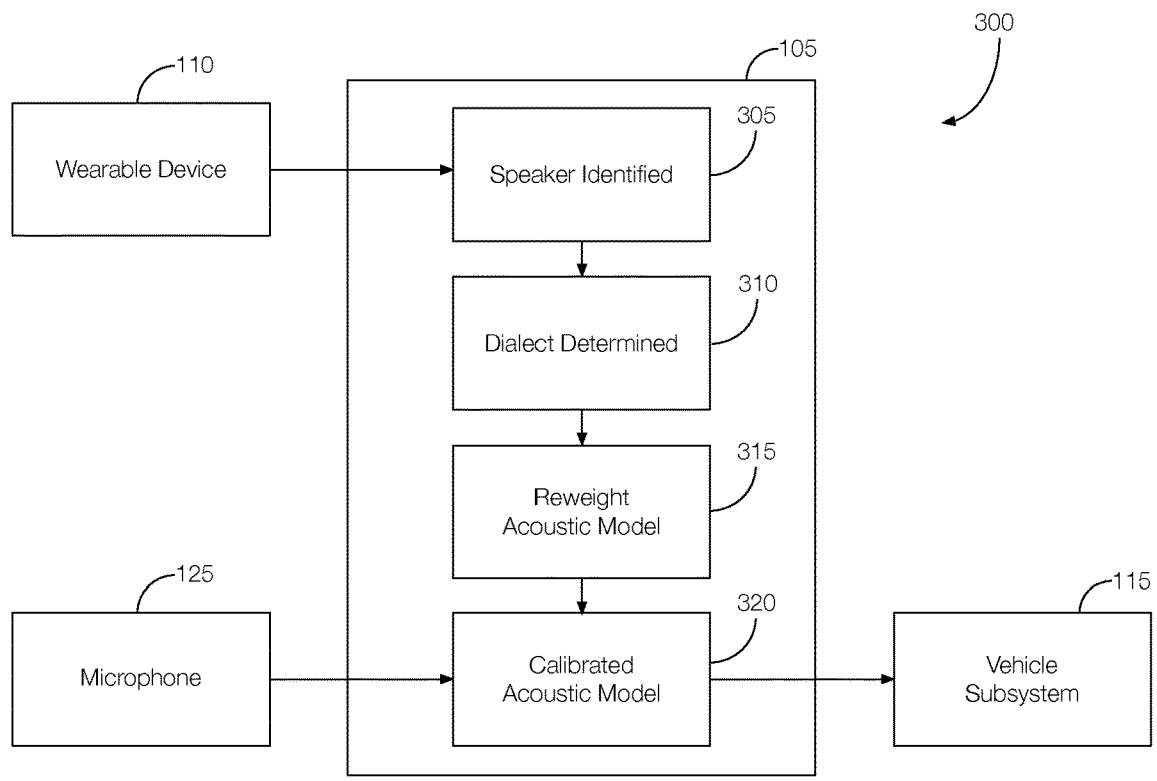
FIG. 3 is a block diagram illustrating an example data flow.

FIG. 3 is a block diagram 300 illustrating an example data flow. The wearable device 110 sends the identification information to the voice processing system 105. At block 305, the voice processing system 105 identifies the speaker, and at block 310, the voice processing system 105 determines the speaker's dialect. At block 315, the voice processing system 105 adjusts the acoustic model according to the dialect to generate the calibrated acoustic model, which is shown at block 320. Speech is received at the voice processing system 105, via the microphone 125, and converted to the acoustic signal. The acoustic signal is passed through the calibrated acoustic model, which helps the voice processing system 105 to better process and interpret the speech. If the speech includes a voice command, the voice processing system 105 may output a command to one or more vehicle subsystems 115.

Figure 4:
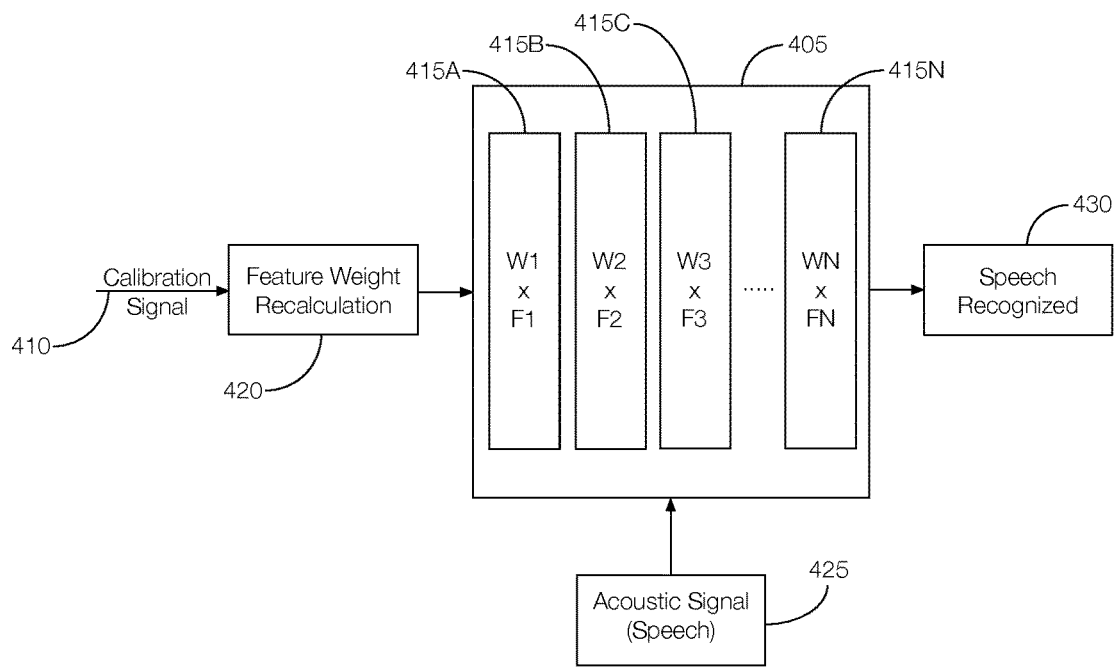
FIG. 4 is a block diagram illustrating an example adjustment of an acoustic model that may be incorporated into the voice processing system.

FIG. 4 is a block diagram 400 illustrating an example adjustment of an acoustic model that may be incorporated into the voice processing system 105. The calibrated (i.e., adjusted) acoustic model is shown at block 405. The voice processor 135 may apply a calibration signal 410 to the predetermined acoustic model. The calibration signal may identify particular changes to be made to the weight applied to one or more features, shown in blocks 415A-415N. Block 420 indicates the programming of the voice processor 135 to reweight each of the features 415A-415N according to the calibration signal. As discussed above, reweighting the features 415A-415N may include selecting one or more of the voice features 415A-415N, where each voice feature is associated with a particular phoneme, and adjusting a weight applied to any of the selected voice features. The weight applied may indicate how much influence a particular phoneme should receive in interpreting the speaker's speech. Thus, increasing the weight may make the feature more influential while decreasing the weight may make the feature less influential. The acoustic signal, represented by block 425, may be passed through the calibrated acoustic model, and the output of the calibrated acoustic model 405, shown at block 430, may include the recognized speech.

Figure 5:
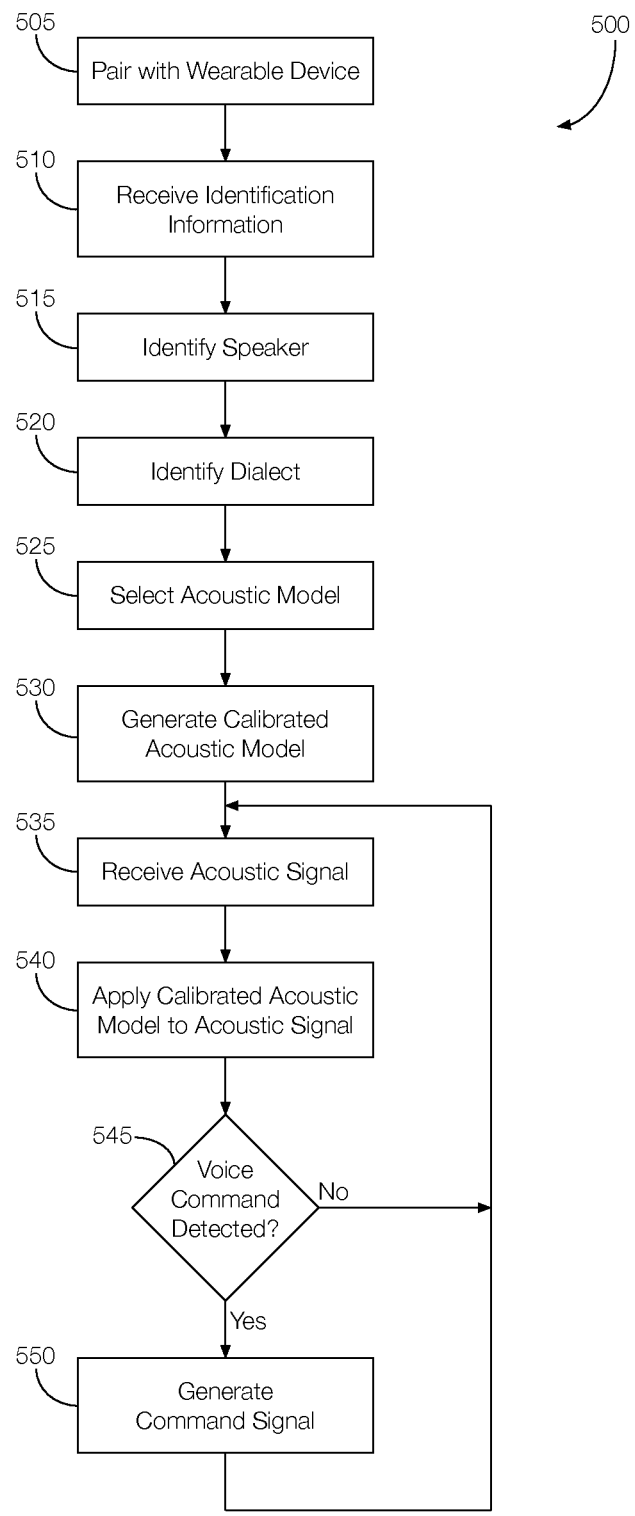
FIG. 5 is a flowchart of an example process that may be executed by the voice processing system to account for a particular user's speech patterns.

FIG. 5 is a flowchart of an example process 500 that may be executed by the voice processing system 105 to account for a particular user's speech patterns. The process 500 may be executed while the host vehicle 100 is running. For instance, the process 500 may begin when the host vehicle 100 is first turned on and continue to execute until the host vehicle 100 is turned off, until all passengers have exited the host vehicle 100, until no wearable devices 110 are paired with the host vehicle 100, or until the host vehicle 100 is otherwise no longer able to receive and process voice commands.

At block 505, the voice processing system 105 may pair with the wearable device 110. The voice processing system 105 may pair with the wearable device 110 associated with, e.g., the driver or another vehicle occupant. The pairing may be facilitated by, e.g., the communication device 120.

At block 510, the voice processing system 105 may receive identification information from the wearable device 110. The identification information may, in one possible approach, include dialect information. The identification information may be received via the communication device 120 and transmitted to, e.g., the voice processor 135.

At block 515, the voice processing system 105 may identify the speaker. That is, the voice processing system 105 may process the identification information to determine who is wearing the wearable device 110. In some instances, the voice processor 135 may identify the speaker and select a profile associated with the speaker from the data storage medium 130.

At block 520, the voice processing system 105 may identify a dialect associated with the person identified at block 515. The voice processor 135 may, in one possible implementation, determine the dialect from, e.g., the identification information.

At block 525, the voice processing system 105 may select one of the predetermined acoustic models. Multiple predetermined acoustic models may be stored in the data storage medium 130, and the voice processor 135 may select one of the predetermined acoustic models from among those stored.

At block 530, the voice processing system 105 may adjust the predetermined acoustic model selected at block 525. For instance, the voice processor 135 may, using the dialect identified at block 520 or possibly other information received from the wearable device 110, adjust the predetermined acoustic model to generate the calibrated acoustic model. One way to adjust the predetermined acoustic model includes selecting one or more voice feature, from among multiple voice features, and adjusting the weight that is applied to one or more of the voice features. As discussed above, each voice feature is associated with a phoneme, so adjusting the weight for a voice feature indicates the amount of influence that should be given to each phoneme. Increasing the weight may mean a more influential phoneme while reducing the weight may indicate a less influential phoneme.

At block 535, the voice processing system 105 may receive an acoustic signal. The acoustic signal may be received via the microphone 125 and may represent speech uttered in the passenger compartment of the host vehicle 100.

At block 540, the voice processing system 105 may apply the calibrated model to the acoustic signal. For instance, the voice processor 135 may receive the acoustic signal from the microphone and apply the calibrated acoustic model generated at block 530 to the acoustic signal.

At decision block 545, the voice processing system 105 may determine whether the acoustic signal includes any voice commands. The voice processor 135, for instance, may make such a determination by comparing utterances represented by the acoustic signal to the weighted features, and determining whether the utterances represent phonemes associated with voice commands. If the acoustic signal includes voice commands, the process 500 may proceed to block 550. Otherwise, the process 500 may return to block 535.

At block 550, the voice processing system 105 may generate and output an appropriate command signal. The voice processor 135 may generate the command signal associated with the voice command detected at block 545. Further, the voice processor 135 may output the command signal to the appropriate vehicle subsystem so that the voice command can be carried out. The process 500 may continue at block 535.

Accordingly, the disclosed voice processing system 105 can dynamically reweight the predetermined acoustic model as a function of identification information provided by the wearable device 110. Since traditional acoustic models are built as a linear combination of feature vectors derived from training sets under a variety of appropriate combinations, and since many static models do a poor job of handling accented speech, the voice processing system 105 can calibrate the acoustic model to the particular speaker identified by the wearable device 110. Calibrating the acoustic model can include, e.g., selecting and weighting applicable feature vectors.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle voice processor comprising a processing device and a data storage medium, wherein the processing device is programmed to:

receive identification information from a wearable device;

identify an individual speaker from the identification information;

identify a dialect associated with the individual speaker;

select a predetermined acoustic model based on the identified individual speaker; and then dynamically and in real-time adjust the predetermined acoustic model thereby generating a calibrated acoustic model, based at least in part on the dialect associated with the identified individual speaker, by reweighting feature vectors in the predetermined acoustic model in accordance with the dialect associated with the individual speaker.

2. The vehicle voice processor of claim 1, wherein the processing device is programmed to apply the calibrated acoustic model to an acoustic signal upon dynamically determining the calibrated acoustic model.

3. The vehicle voice processor of claim 1, wherein the processing device is programmed to output a vehicle command based at least in part on the acoustic signal and the calibrated acoustic model.

4. The vehicle voice processor of claim 1, wherein adjusting the predetermined acoustic model includes selecting a voice feature from a plurality of voice features.

5. The vehicle voice processor of claim 4, wherein adjusting the predetermined acoustic model includes adjusting a weight associated with the selected voice feature.

6. The vehicle voice processor of claim 1, wherein adjusting the predetermined acoustic model includes adjusting a weight associated with at least one of a plurality of voice features.

7. The vehicle voice processor of claim 6, wherein each of the plurality of voice features is associated with a phoneme.

8. The vehicle voice processor of claim 1, further comprising a communication device programmed to pair with the wearable device.

9. The vehicle voice processor of claim 1, further comprising a microphone configured to receive an analog acoustic signal.

10. A method comprising:

receiving identification information from a wearable device;

identifying an individual speaker from the identification information;

identifying a dialect associated with the individual speaker;

selecting a predetermined acoustic model; and then dynamically and in real-time adjusting the predetermined acoustic model thereby generating a calibrated acoustic model, based at least in part on the dialect associated with the identified individual speaker, by reweighting feature vectors in the predetermined acoustic model in accordance with the dialect associated with the individual speaker.

11. The method of claim 10, further comprising applying the calibrated acoustic model to an acoustic signal upon dynamically determining the calibrated acoustic model.

12. The method of claim 10, outputting a vehicle command based at least in part on the acoustic signal and the calibrated acoustic model.

13. The method of claim 10, wherein adjusting the predetermined acoustic model includes selecting a voice feature from a plurality of voice features.

14. The method of claim 10, wherein adjusting the predetermined acoustic model includes adjusting a weight associated with at least one of a plurality of voice features.

15. The method of claim 14, wherein each of the plurality of voice features is associated with a phoneme.

16. A vehicle system comprising:

a communication device programmed to pair with the wearable device;

a microphone configured to receive an acoustic signal; and a voice processor programmed to:

receive identification information from the wearable device, identify an individual speaker from the identification information, identify a dialect associated with the individual speaker, select a predetermined acoustic model based on the identified individual speaker, and then dynamically and in real-time adjust the predetermined acoustic model thereby generating a calibrated acoustic model, based at least in part on the dialect associated with the identified individual speaker, by reweighting feature vectors in the predetermined acoustic model in accordance with the dialect associated with the individual speaker.

* * * * *